United States Patent [19]
Bourgeois

[11] Patent Number: 5,395,497
[45] Date of Patent: Mar. 7, 1995

[54] PROCESS FOR THE MANUFACTURE OF AN AQUEOUS SOLUTION OF SODIUM HYDROXIDE

[75] Inventor: Louis Bourgeois, Brussels, Belgium

[73] Assignee: Solvay (Société Anonyme), Brussels, Belgium

[21] Appl. No.: 73,735

[22] Filed: Jun. 8, 1993

[30] Foreign Application Priority Data

Jul. 3, 1992 [BE] Belgium .............................. 09200622

[51] Int. Cl.⁶ .............................................. B01D 61/44
[52] U.S. Cl. ................................ 204/182.4; 210/650; 210/651; 423/551
[58] Field of Search ................ 204/98, 182.4, 103; 423/551; 210/651, 650

[56] References Cited

U.S. PATENT DOCUMENTS 4,584,077  4/1986  Chlanda et al. .................. 204/182.4
4,592,817  6/1986  Chlanda et al. .................. 204/182.4
4,629,545  12/1986 Mani et al. ....................... 204/182.4
4,636,289  1/1987  Mani et al. ....................... 204/182.4
5,089,102  2/1992  Voss .................................. 204/182.3

FOREIGN PATENT DOCUMENTS 0360093  3/1990  European Pat. Off. .
0426649  5/1991  European Pat. Off. .

Primary Examiner—John Niebling
Assistant Examiner—Arun S. Phasge
Attorney, Agent, or Firm—Emmanuel J. Lobato

[57] ABSTRACT

Process for the manufacture of an aqueous solution of sodium hydroxide by electrodialysis of an aqueous solution (15) of a sodium salt derived from an acid of pK lower than the pK of carbonic acid, the solution being obtained by circulating an aqueous solution of the said acid (14) and an aqueous solution of sodium carbonate (13) on either side of a cationic membrane (12).

11 Claims, 1 Drawing Sheet

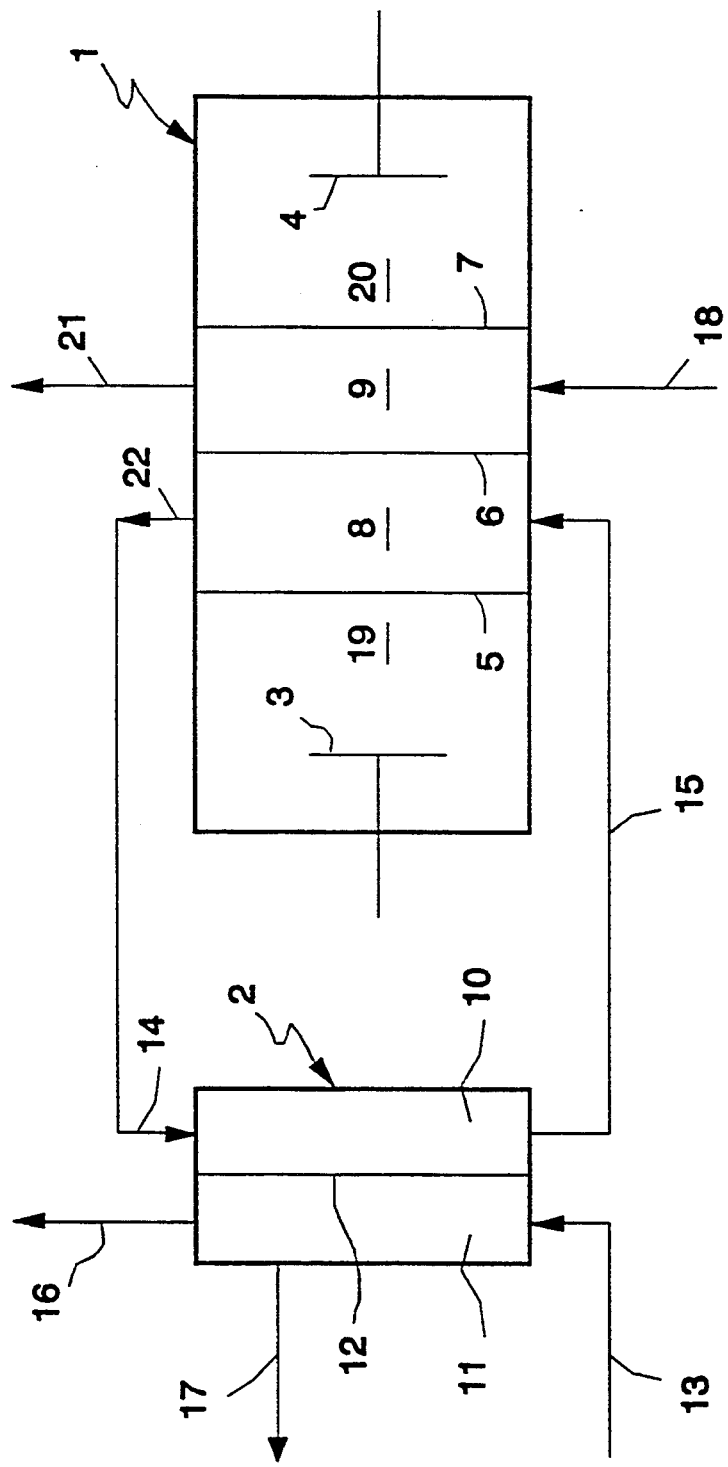

PROCESS FOR THE MANUFACTURE OF AN AQUEOUS SOLUTION OF SODIUM HYDROXIDE

BACKGROUND OF THE INVENTION

The invention relates to the manufacture of sodium hydroxide.

It relates more particularly to a process for the manufacture of an aqueous solution of sodium hydroxide by electrodialysis.

Electrodialysis is a well-known technique for producing aqueous solutions of sodiumhydroxide. Thus, in U.S. Pat. No. 4,238,305 a process is described in which an electrodialysis cell comprising an alternation of cationic membranes is used, water or a dilute aqueous solution of sodium hydroxide is introduced into the compartments bounded between a cationic membrane and the anionic face of a bipolar membrane and an aqueous solution of sodium carbonate is introduced into the compartments bounded between a cationic membrane and the cationic face of a bipolar membrane. In this known process an alkaline pH is maintained in the compartments which are fed with water or the sodium hydroxide solution and an acidic pH in the compartments which are fed with the sodium carbonate solution. Carbon dioxide is thus generated in the acidic compartments.

In this known process the generation of carbon dioxide in the electrodialysis cell presents disadvantages. In fact, the bipolar membranes employed in these known processes are formed by joining an anionic membrane and a cationic membrane, so that, if carbon dioxide is formed in the pores of the cationic face of the bipolar membrane, the two membranes of which it consists run the risk of parting from each other. On the other hand, the gas thus produced subjects the membranes to mechanical stresses which are liable to damage them and, in addition, significantly increases the electrical resistance of the electrolyte and, consequently, the electricity consumption.

A process for the production of sodium carbonate from trona, by electrodialysis, is described in U.S. Pat. No. 4,592,817. In this known process the formation of carbon dioxide in the acid compartment of the electrodialysis cell is avoided by employing, to feed the latter, a sodium sulphate solution obtained by decomposing sodium carbonate with a solution of sulphuric acid. Since the decomposition of the sodium carbonate is performed by mixing the sodium carbonate with the solution of sulphuric acid in a reactor outside the electrodialysis cell, the carbon dioxide formed in the reactor does not enter the electrodialysis cell. In practice, however, the use of this known process has been found to be difficult, since an untimely release of carbon dioxide in the electrodialysis cell is inevitable in the event of incomplete decomposition of the sodium carbonate.

SUMMARY OF THE INVENTION

The invention is aimed at overcoming the disadvantages of these known processes, by providing an improved process which makes it possible to produce an aqueous solution of sodium hydroxide from sodium carbonate, in an electrodialysis cell, without any risk of carbon dioxide forming in the electrodialysis cell.

The invention consequently relates to a process for the manufacture of sodium hydroxide by electrodialysis of an aqueous solution of a sodium salt in an electrodialysis cell containing bipolar membranes, according to which use is made of an aqueous solution of a sodium salt derived from an acid of pK lower than the pK of carbonic acid, the solution being obtained by circulating an aqueous solution of the said acid and an aqueous solution of sodium carbonate on either side of a cationic membrane.

In the process according to the invention the acid used must be an acid which is water-soluble and which forms a water-soluble salt with sodium. It is chosen, furthermore, from acids whose pK is lower than the pK of carbonic acid. For this purpose, it is generally chosen from acids whose pK in aqueous solution at 25° C. is lower than 6.35, which is the generally accepted value for the pK of carbonic acid in aqueous solution at 25° C. (D.D. Perrin—"Dissociation constants of inorganic acids and bases in aqueous solution" —International Union of Pure and Applied Chemistry—Butterworths—1969 —page 152). In what follows, the pK values mentioned will be considered as being those of the acid in aqueous solution at 25° C.

In the process according to the invention the acids which have a pK not exceeding 4 are especially recommended. It is appropriate to avoid an acid with an exaggeratedly high dissociation constant (too low pK), in order to limit, during the electrodialysis, the flow of protons into the aqueous solution of sodium hydroxide to be produced. To this end, it is recommended to choose the acid from those whose pK is higher than 0, preferably at least 1. Preferred acids are those which have a pK of 1 to 3.

The acid may be equally well an inorganic acid or an organic acid. It is preferred to choose an inorganic acid such as, for example, sulphuric acid or phosphoric acid. Although sulphuric acid (pK=1.96) is suitable, preference is given to phosphoric acid (pK=2.15).

The origin of the sodium carbonate solution is not critical. It may be obtained, for example, by dissolving anhydrous sodium carbonate in water. In an alternative form, it can also be manufactured by dispersing sodium sesquicarbonate in water, for example sesquicarbonate extracted from a trona deposit, the dispersion being optionally followed by filtration to remove insoluble matter, especially sodium bicarbonate.

The solution of acid and the solution of sodium carbonate may be dilute solutions or concentrated solutions. Concentrated solutions are preferred. The respective concentrations of the two solutions must, however, be compatible with the solubility of the products formed in the reactor (especially of sodium bicarbonate and of the sodium salt of the acid) to avoid solid precipitates being formed therein. In practice the optimum concentrations of the two solutions will consequently depend on various parameters, especially the temperature, the nature of the membrane and the acid chosen. In each individual case they can be determined by routine laboratory work. Insofar as the sodium carbonate solution is concerned, weight concentrations of at least 10% of sodium carbonate at 20° C. are generally suitable. The optimum concentration of the acid solution will obviously depend on the acid chosen. In the case of solutions at 20° C. it is advantageously at least 10% by weight in the case of a solution of sulphuric acid and at least 4% by weight in the case of a solution of orthophosphoric acid. In the case where the electrodialysis is performed at high temperature, the respective concentrations of the sodium carbonate solution and of the acid solution may be higher. For example, in the case of a temperature of at least 50° C., the sodium carbonate solution may advantageously have a weight content of at least 12% of sodium carbonate, and the acid solution may advantageously have a weight content of acid of at least 20% (in the case where the chosen acid is sulphuric acid) or 10% (in the case where the chosen acid is orthophosphoric acid).

In accordance with the invention the sodium carbonate solution and the solution of acid of pK lower than 6.35 are circulated respectively on either side of a cationic membrane, so as to produce, by dialysis through the cationic membrane, a migration of sodium ions from the sodium carbonate solution towards the acid solution and the migration of protons from the acid solution towards the sodium carbonate solution. Dialysis is a technique which is well known per se and the optimum operating conditions to be used in the process according to the invention can be easily determined by routine laboratory work (Journal of Membrane Science, 48 (1990), Elsevier Science Publishers B.V., Amsterdam, pages 155–179, Eleanor H. Cwirko & Ruben G. Carbonnel: "A theoretical analysis of Donnan dialysis across charged porous membranes"). An aqueous solution of the sodium salt of the acid of pK lower than 6.35, which is free from sodium carbonate, is thus collected. In accordance with the invention it is conveyed into the electrodialysis cell.

During the electrodialysis, the electrodialysis cell is fed, on the one hand, with the solution of the sodium salt of the acid of pK lower than 6.35 and, on the other hand, with water or a dilute aqueous solution of sodium hydroxide. A dilute aqueous solution of sodium hydroxide is intended to denote an unsaturated solution. The sodium hydroxide concentration in the aqueous solution is determined by the need to avoid damage to the membranes by the sodium hydroxide. To this end it is recommended to choose a concentration of sodium hydroxide which is lower than 10 moles/l, preferably lower than 5 moles/l, concentrations not exceeding 2.5 moles/l being especially recommended. In practice good results are obtained by choosing aqueous solutions in which the sodium-hydroxide concentration is higher than 0.2 mole/l, preferably at least 0.5 mole/l, preferred concentrations lying between 1 and 2 moles/l.

The electrodialysis may be carried out in any electrodialysis cell with bipolar membranes which is commonly employed for the production of aqueous solutions of sodium hydroxide, for example a cell of the two-compartment type or a cell of the three-compartment type, such as those described in Patents US-A-4,238,305 and US-A-4,592,817.

In an advantageous embodiment of the process according to the invention an electrodialysis cell is used which comprises, between an anode and a cathode, at least two compartments bounded respectively between a cationic membrane and two bipolar membranes which are arranged on either side of the cationic membrane and each of which has an anionic face directed towards the anode, the aqueous solution of the sodium salt is introduced into that of the two compartments which is closer to the anode and water or a dilute aqueous solution of sodium hydroxide is introduced into the other compartment.

A cationic membrane is intended to denote a nonporous thin sheet which is selectively permeable to cations and impervious to anions. The cationic membranes which can be employed in the process according to the invention must be made of a substance which is inert towards aqueous sodium hydroxide solutions. Cationic membranes which can be employed in the process according to the invention are, for example, sheets of fluoropolymer containing cationic functional groups derived from sulphonic acids, carboxylic acids or phosphonic acids or mixtures of such functional groups. Examples of membranes of this type are those described in Patents GB-A-1,497,748 (Asahi Kasei Kogyo K.K.), GB-A-1,522,877 (Asahi Glass Company Ltd) and GB-A-1,402,920 (Diamond Shamrock Corp.). Membranes which are particularly suited for this application of the cell according to the invention are those known under trademarks "Nafion" (Du Pont) and "Flemion" (Asahi Glass Company Ltd).

The bipolar membranes are membranes which exhibit, on one face, the properties of a cationic membrane and, on the other face, the properties of an anionic membrane, an anionic membrane being, by definition, a nonporous thin sheet which is selectively permeable to anions and impervious to cations. The bipolar membranes may be generally obtained by joining a cationic membrane and an anionic membrane by using for this purpose, for example, the techniques described in British Patent Application GB-A-2,122,543 and in international Patent Application WO 89/1059 (both under the name of Unisearch Ltd). Artionic membranes which can be employed in the manufacture of bipolar membranes that can be employed in the process according to the invention are sheets made of a polymeric substance which is inert towards aqueous solutions of sodium hydroxide and which contains quaternary ammonium groups acting as stationary anionic sites.

In practice, cationic membranes are not ideally impervious to anions and anionic membranes are not ideally impervious to cations. By definition, the current efficiency of a cationic membrane is the molar fraction of the cation which actually passes through the membrane under the action of one faraday. Similarly, the current efficiency of an anionic membrane is the molar fraction of the anion which actually passes through the membrane under the action of one faraday.

BRIEF DESCRIPTION OF THE DRAWING

Special features and details of the invention will emerge from the following description of the single figure of the attached drawing, which shows diagrammatically a plant for making use of a particular embodiment of the process according to the invention.

DESCRIPTION OF THE PREFERRED EMBODIMENTS

The plant shown in the figure comprises an electrodialysis cell 1 and a dialysis reactor 2.

The electrodialysis cell 1 is of the two-compartment type. It successively comprises, between an anode 3 and a cathode 4, a bipolar membrane 5, a cationic membrane 6 and a second bipolar membrane 7. The bipolar membranes 5 and 7 are arranged in the cell so that they have their anionic face directed towards the anode. Membranes 5, 6 and 7 thus define two compartments 8 and 9 in the cell.

In practice, industrial electrodialysis cells contain a large number (generally several tens) of compartments such as 8 and 9.

The reactor 2 comprises a vessel divided into two chambers 10 and 11 by a cationic membrane 12.

When the plant shown in the figure is in use an aqueous solution of sodium carbonate 13 is circulated in the chamber 11 of the reactor 2. At the same time an aqueous solution of phosphoric acid 14 is circulated in the chamber 10 of the reactor 2. The aqueous solution of phosphoric acid may optionally contain sodium phosphate. During the circulation of the two solutions 13 and 14 in the reactor 2 sodium cations migrate from the chamber 11 into the chamber 10 through the cationic membrane 12; at the same time protons migrate from the chamber 10 into the chamber 11 through the membrane 12, so as to maintain the ionic equilibrium of the solutions in the two chambers. An aqueous solution of sodium phosphate 15 is collected from the chamber 10 and carbon dioxide 16 and an aqueous solution of sodium bicarbonate 17 from the chamber 11.

The aqueous solution of sodium phosphate 15 is introduced into the compartment 8 of the electrodialysis cell 1. At the same time water (or a dilute solution of sodium hydroxide) 18 is introduced into the compartment 9 of the cell. In the end compartments 19 and 20, containing the electrodes 3 and 4, an aqueous electrolyte is circulated, the composition of which is not critical. Under the effect of the difference in potential between electrodes 3 and 4 water dissociation takes place on the bipolar membranes 5 and 7, giving rise to the formation of protons in the compartment 8 and of hydroxyl ions in the compartment 9. At the same time sodium cations migrate from the compartment 8 into the compartment 9, passing through the cationic membrane 6. Sodium hydroxide is thus formed in the compartment 9 and phosphoric acid in the compartment 8. An aqueous solution of sodium hydroxide 21 is then collected from the compartment 9 and an aqueous solution 22 of phosphoric acid from the compartment 8. The solution 22 (which may usually contain dissolved sodium phosphate) can be recycled into the reactor 2, where it then forms the starting solution 14 of phosphoric acid.

The aqueous solution 21 of sodium hydroxide can be exploited as it is. Alternatively, it may first be subjected to partial evaporation in order to concentrate the sodium hydroxide therein.

The carbon dioxide collected from the reactor 2 may, for example, be exploited in an ammonia-soda plant.

The aqueous solution of sodium bicarbonate 17 collected from the chamber 11 of the reactor 2 may be subjected to an evaporation to crystallise sodium bicarbonate which can be exploited as it is. Alternatively, it may be directed to an ammonia-soda plant.

It is claimed:

1. Process for the manufacture of an aqueous solution of sodium hydroxide, comprising:

circulating an aqueous solution of sodium carbonate and an aqueous solution of an acid of pK lower than the pK of carbonic acid, respectively on either side of a cationic membrane, to produce by dialysis through the cationic membrane an aqueous solution of a sodium salt derived from said acid; and electrodialysing said aqueous solution of sodium salt in an electrodialysis cell containing bipolar membranes.

2. Process according to claim 1, further comprising, arranging said electrodialysis cell in order to have between an anode and a cathode, at least two compartments bounded respectively between a cationic membrane and two bipolar membranes arranged on either side of the cationic membrane and each of which has an anionic face directed towards the anode;

introducing said aqueous solution of the sodium salt into one compartment of the two compartments which is closer to the anode; and introducing water or dilute aqueous solution of sodium hydroxide into the other one of said two compartments.

3. Process according to claim 1, in which said acid is chosen from those whose pK does not exceed 4.

4. Process according to claim 3, in which the acid is chosen from those which have a pK of 1 to 3.

5. Process according to claim 1, in which the acid is an inorganic acid.

6. Process according to claim 5, in which the acid chosen is phosphoric acid.

7. Process according to claim 1, in which the aqueous solution of acid is a solution collected from the electrodialysis.

8. Process according to claim 1, in which the aqueous solution of sodium carbonate is obtained by dissolving sodium sesquicarbonate in water.

9. Process according to claim 1, in which the electrodialysis cell comprises, an anode and a cathode, between the anode and the cathode at least two compartments bounded respectively between a cationic membrane and two bipolar membranes arranged on either side of the cationic membrane and each of which has an anionic face directed towards the anode, the aqueous solution of the sodium salt is introduced into that of the two compartments which is closer to the anode, and water or a dilute aqueous solution of sodium hydroxide is introduced into the other compartment.

10. Process according to claim 9, in which the acid solution is an aqueous solution collected from the compartment (8) fed with the aqueous solution of the sodium salt.

11. Process according to claim 1, in which the acid is chosen from those whose pK at 25° C. is lower than 6.35.

* * * * *